United States Patent
Ballard et al.

(10) Patent No.: US 11,807,558 B2
(45) Date of Patent: Nov. 7, 2023

(54) BALLASTED CLARIFICATION SYSTEM

(71) Applicant: SUEZ International, Paris la Défense (FR)

(72) Inventors: Peter Temple Ballard, Glen Allen, VA (US); Raed Labban, Glen Allen, VA (US)

(73) Assignee: SUEZ INTERNATIONAL, Paris la Defense (FR)

( * ) Notice: Subject to any disclaimer, the term of this patent is extended or adjusted under 35 U.S.C. 154(b) by 0 days.

(21) Appl. No.: 14/947,795

(22) Filed: Nov. 20, 2015

(65) Prior Publication Data

US 2016/0145126 A1 May 26, 2016

Related U.S. Application Data

(60) Provisional application No. 62/082,941, filed on Nov. 21, 2014.

(51) Int. Cl.
| | |
|---|---|
| *C02F 1/52* | (2023.01) |
| *B01D 21/01* | (2006.01) |
| *B01D 21/26* | (2006.01) |
| *B01D 21/28* | (2006.01) |
| *C02F 1/56* | (2023.01) |
| *C02F 1/38* | (2023.01) |
| *C02F 1/72* | (2023.01) |

(52) U.S. Cl.
CPC ............ *C02F 1/5236* (2013.01); *B01D 21/01* (2013.01); *B01D 21/267* (2013.01); *B01D 21/28* (2013.01); *C02F 1/56* (2013.01); *C02F 1/385* (2013.01); *C02F 1/72* (2013.01); *C02F 2301/046* (2013.01); *C02F 2303/18* (2013.01); *C02F 2305/12* (2013.01)

(58) Field of Classification Search
CPC .................................................. C02F 1/5236
See application file for complete search history.

(56) References Cited

U.S. PATENT DOCUMENTS

| | | |
|---|---|---|
| 6,210,587 B1 | 3/2001 | Vion |
| 7,311,841 B2 | 12/2007 | Binot et al. |

(Continued)

OTHER PUBLICATIONS

International Search Report; completed Jan. 25, 2016; 2 pages.

(Continued)

*Primary Examiner* — Peter Keyworth
(74) *Attorney, Agent, or Firm* — Harness Dickey & Pierce PLC

(57) ABSTRACT

In general, the present invention is directed to systems and methods of providing improved ballasted clarification systems for the treatment of water or wastewater. In accordance with some embodiments, a method may include introducing an influent including the water or wastewater and a coagulant; agitating or mixing the influent causing flocs to develop; introducing polymer and ballast wherein the ballast has an aspect ratio of less than 1.15; agitating or mixing the influent causing the ballast to move through the influent and penetrate the flocs; agitation or mixing the flocs to cause larger flocs to form through collision of smaller flocs among the flocs; providing the influent into a clarifying tank having a bottom and a top, wherein the ballast particles in flocs cause the flocs to settle to the bottom of the clarifier; and outputting an effluent from the top of the clarifying tank.

18 Claims, 8 Drawing Sheets

(56) References Cited

U.S. PATENT DOCUMENTS 8,157,988 B2 4/2012 Quevillon
2008/0314830 A1 12/2008 Banerjee et al.

OTHER PUBLICATIONS

European Search Report dated Jun. 6, 2018; 7 pages.
Wikipedia Contributors, Equivalent spherical diameter, Wikipedia, The Free Encyclopedia, https://en.wikipedia.org/w/index.php?title=Equivalent_spherical_diameter&oldid=1118992522 (accessed Feb. 16, 2023).

BALLASTED CLARIFICATION SYSTEM

RELATED APPLICATIONS

The present application claims priority to U.S. Provisional Patent Application Ser. No. 62/082,941, filed on Nov. 21, 2014 entitled "Improved Ballasted Clarification System," which is incorporated herein by reference in its entirety.

BACKGROUND

In general, the present invention is directed to an improved clarification system for the treatment of water or wastewater. More specifically, the present invention is directed to improved systems and methods of providing a ballasted flocculation system.

Clarification is a way of treating water to make it clear by removing impurities. One method of clarifying water is through flocculation, a process in which suspended matter can be removed from the water by agglomerating it into particles large enough to settle by gravity. In general, flocculation is a process that may clarify a liquid. Water or wastewater (for example, drinking water, wastewater, combined sewer overflow water, etc.) may be introduced into a flocculation system in which a coagulated precipitate may form due to the destabilization of the colloidal wastewater.

Coagulants that may be used include metal and polymer coagulants. Metal coagulants are generally based on iron or aluminum. Iron coagulants may include, but are not limited to, ferric sulfate, ferrous sulfate, ferric chloride, and ferric chloride sulfate. Aluminum coagulants may include, but are not limited to, aluminum sulfate, aluminum chloride (including polyaluminium chloride), and sodium aluminate. Other chemicals or materials may also be used, such as but not limited to sodium alginates, soluble starch products, hydrated lime, magnesium carbonate, or synthetic polymers. In addition, a coagulant aid may be inserted—including, for example, recycled sludge.

While the particles or precipitate may stick to one another and spontaneously form irregular particle clusters, or flocs without stirring (i.e., perikinetic aggregation or flocculation), the water or wastewater may also be mixed or stirred, thereby causing shear stress and quickly generating clusters or flocks (i.e., orthokinetic aggregation or flocculation). The degree of flocculation is often governed by the velocity gradients and time of flocculation. Shear stress may be provided to a flocculation system through hydraulic mixing (for example but not limited to, baffled chambers, spiral flow chambers), mechanical mixing (such as but not limited to stirring, rotating or reciprocating blades, paddles, or propellers), and diffusers or grid systems that may, for example, utilize diffused air to create turbulence in flowing water.

As the water or wastewater is mixed or stirred, larger and heavier flocs may be formed which may settle down out of the water or wastewater, and may be removed as sludge. Clarified water may exit the top of the system. In order to increase the speed with which the flocs settle, a ballast material may be used in a ballasted flocculation process.

Ballasted flocculation—also known as high rate clarification slightly modifies the process wherein where the agglomerated particles—or "flocs" may comprise a ballasted particle, causing the flocs to sink more quickly thereby speeding up the clarification process.

In addition, existing ballasted clarification systems often have a relatively high loss rate of ballast. Such loss of ballast not only raises the costs of operating a ballasted clarification system, but can also cause excessive wear and/or damage to downstream processing components (since such components may be processing sludge with sand or other such ballast therein). Accordingly, it is desirable to reduce ballast loss during operation of a ballasted clarification system.

It is also desirable to reduce the size necessary of ballasted clarification systems. Such reduction in size may result in a smaller footprint, and a smaller capital expense and/or operating expense. For example, increasing the rise rate of a ballasted clarification system may allow a smaller system to be used. However, currently used ballast (for example, sand) generally does not permit rise rates above 40 m/ft$^2$ without excessive ballast loss in the effluent. Accordingly, it is desirable to operate a ballasted clarification system at rise rates greater than 40 gpm/ft$^2$ with acceptable ballast loss.

Accordingly, it is desirable to have a ballasted flocculation system in which the ballast material is selected or configured to produce effective and efficient clarification.

SUMMARY OF THE INVENTION

Aspects in accordance with some embodiments of the present invention may include a method of providing ballasted clarification of water or wastewater, comprising: introducing an influent into a first zone, the influent comprising the water or wastewater and a coagulant; agitating or mixing the influent in the first zone, wherein flocs develop in the influent caused at least in part by the coagulant; providing the influent from the first zone into a second zone; introducing polymer and ballast into the influent in the second zone, wherein the ballast has an aspect ratio of less than 1.15; agitating or mixing the influent in the second zone, wherein the agitation or mixing in the second zone causes the ballast to move through the influent and penetrate the flocs; providing the influent from the second zone into a third zone; agitating or mixing the influent in the third zone, wherein the agitation or mixing in the third zone causes larger flocs to form through collision of smaller flocs among the flocs; providing the influent into a clarifying tank having a bottom and a top, wherein the ballast particles in flocs cause the flocs to settle to the bottom of the clarifier; outputting an effluent from the top of the clarifying tank, the effluent comprising clear or substantially clear water.

In accordance with aspects of the present invention, a method may further comprise removing sludge comprising settled flocs from the bottom of the clarifier and removing at least some of the ballast from the sludge.

In accordance with aspects of the present invention, a method may further comprise a method wherein the ballast is removed from the sludge using one or more hydro cyclones.

In accordance with aspects of the present invention, a method may further comprise a method wherein the ballast removed from the sludge is recycled to be reintroduced into the second zone.

In accordance with aspects of the present invention, a method may further comprise a method wherein the method of providing ballasted clarification operates in a system with a rise rate greater than forty (40) gpm/ft$^2$.

In accordance with aspects of the present invention, a method may further comprise removing sludge comprising settled flocs from the bottom of the clarifier and removing at least some of the ballast from the sludge, wherein ballast loss is less than 10.8 kilograms per million gallons of water treated.

In accordance with aspects of the present invention, a method may further comprise a method wherein the ballast particles have a density greater than 3.0 g/cm$^3$.

In accordance with aspects of the present invention, a method may further comprise a method wherein the aspect ratio is between 1.0 and 1.10.

In accordance with aspects of the present invention, a method may further comprise a method wherein the ballast material has a density greater than 3.5 g/cm$^3$.

In accordance with aspects of the present invention, a method may further comprise a method wherein the ballast material comprises garnet.

Other aspects in accordance with some embodiments of the present invention may include a ballasted flocculation system comprising: a coagulation tank, the coagulation tank receiving an influent of water or wastewater and a coagulant, and outputting a coagulation tank effluent; a flocculation tank in fluid communication with the coagulation tank and receiving the coagulation tank effluent, the flocculation tank further receiving an input of polymer and ballast particles, and outputting a flocculation tank effluent, wherein the ballast particles have an aspect ratio less than 1.15; a maturation tank in fluid communication with the flocculation tank and receiving the flocculation tank effluent, the maturation tank outputting a maturation tank effluent; a clarifier with a top and a bottom, the clarifier in fluid communication with the maturation tank and receiving the maturation tank effluent, the clarifier outputting treated water from the top of the clarifier and sludge comprising settled flocs from the bottom of the clarifier; a hydrocyclone receiving the sludge and separating the ballast particles from the sludge.

In accordance with aspects of the present invention, a system may further comprise a paddle or mixing device in the coagulation tank; a paddle or mixing device in the flocculation tank; and a paddle or mixing device in the maturation tank; wherein each paddle or mixing device agitates or mixes contents of the tank in which it is located.

In accordance with aspects of the present invention, a system may comprise a paddle or mixing device in the coagulation tank to cause flocs to form.

In accordance with aspects of the present invention, a system may further comprise a system wherein the paddle or mixing device in the flocculation tank causes the ballast particles to move through the coagulation tank effluent and penetrate flocs.

In accordance with aspects of the present invention, a system may further comprise a system wherein the paddle or mixing device in the maturation tank causes larger flocs to form through inertial impaction of the flocs.

In accordance with aspects of the present invention, a system may further comprise a system wherein the system operates with a rise rate greater than 40 gpm/ft$^2$.

In accordance with aspects of the present invention, a system may further comprise a system wherein ballast loss is less than 10.8 kg per million gallons of water treated.

In accordance with aspects of the present invention, a system may further comprise a system wherein the ballast particles have a density greater than 3.0 g/cm$^3$.

In accordance with aspects of the present invention, a system may further comprise a system wherein the ballast particles are comprised of garnet.

In accordance with aspects of the present invention, a system may comprise a ballasted flocculation system utilizing ballast particles with a density greater than 3.0 g/cm$^3$ and an aspect ratio of less than 1.15, the ballasted flocculation system operating with a floc settling velocity of greater than 1.0 cm/s.

DESCRIPTION OF THE DRAWINGS

The present invention can be more fully understood by reading the following detailed description together with the accompanying drawings, in which like reference indicators are used to designate like elements. The accompanying figures depict certain illustrative embodiments and may aid in understanding the following detailed description. Before any embodiment of the invention is explained in detail, it is to be understood that the invention is not limited in its application to the details of construction and the arrangements of components set forth in the following description or illustrated in the drawings. The embodiments depicted are to be understood as exemplary and in no way limiting of the overall scope of the invention. Also, it is to be understood that the phraseology and terminology used herein is for the purpose of description and should not be regarded as limiting. The detailed description will make reference to the following figures, in which.

DETAILED DESCRIPTION

Figure 1:
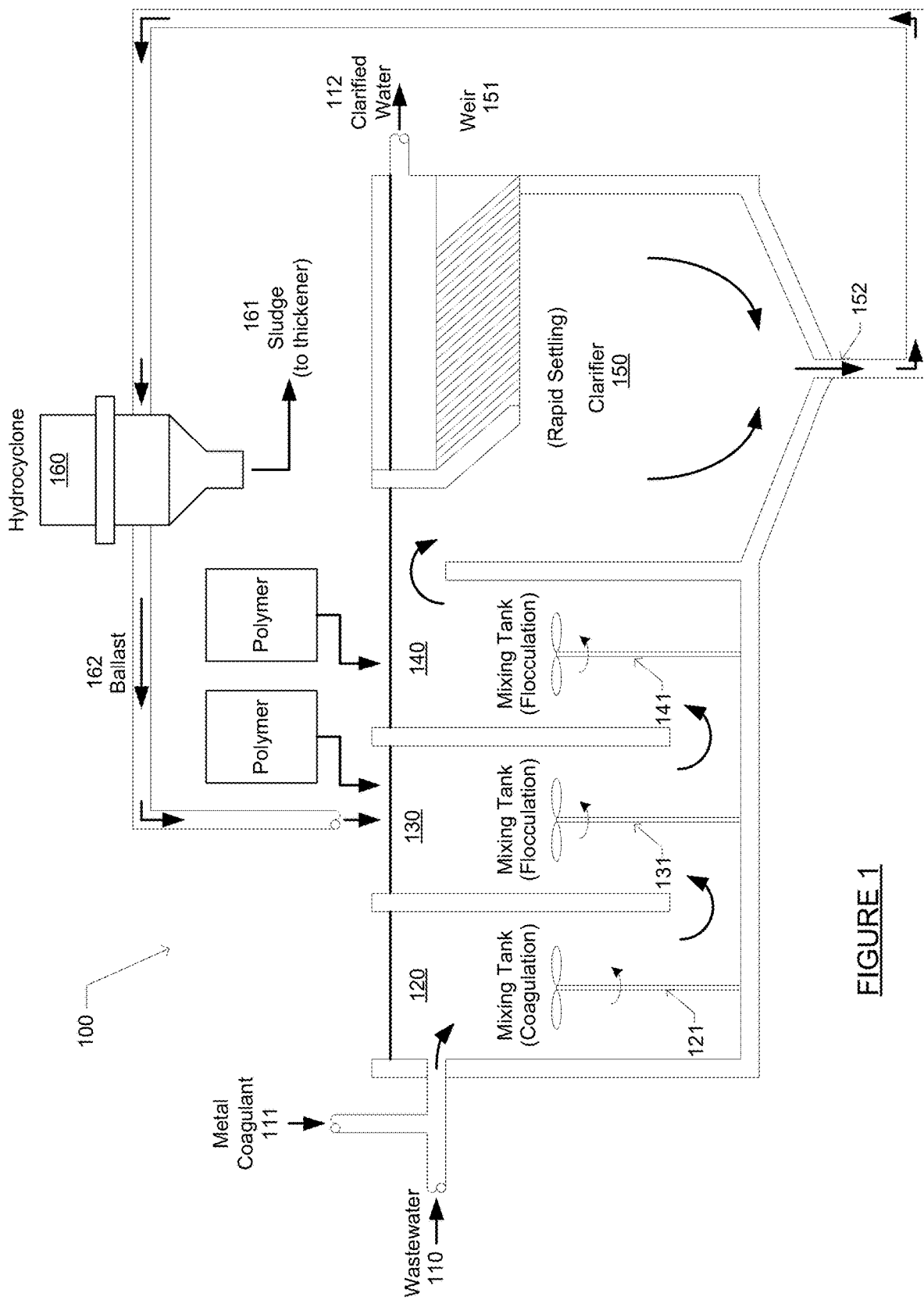
FIG. 1 illustrates an exemplary ballasted clarification system in accordance with some embodiments of the present invention.

Before any embodiment of the invention is explained in detail, it is to be understood that the present invention is not limited in its application to the details of construction and the arrangements of components set forth in the following description or illustrated in the drawings. The present invention is capable of other embodiments and of being practiced or being carried out in various ways. Also, it is to be understood that the phraseology and terminology used herein is for the purpose of description and should not be regarded as limiting.

The matters exemplified in this description are provided to assist in a comprehensive understanding of various exemplary embodiments disclosed with reference to the accompanying figures. Accordingly, those of ordinary skill in the art will recognize that various changes and modifications of the exemplary embodiments described herein can be made without departing from the spirit and scope of the claimed invention. Descriptions of well-known functions and constructions are omitted for clarity and conciseness. Moreover, as used herein, the singular may be interpreted in the plural, and alternately, any term in the plural may be interpreted to be in the singular.

In general, ballasted flocculation is a physical-chemical treatment process that generally uses continuously recycled media and a variety of additives to improve the settling properties of suspended solids through improved floc bridging. Coagulating chemicals (for example, ferric sulfate) generally provides the means by which small particles coalesce into larger particles and the amount and rate of coalescence is a function of the degree of interparticle contact. After introduction of coagulating chemicals, a small slow settling floc is formed. If the liquid mass is gently agitated, contact between the particles increases and they grow in size. The flocculation is greatly improved when it takes place in the presence of previously formed floc particles. The newly formed particles deposit by accretion on the surface of those already present so that they grow in size at a much higher rate producing a heavier, faster settling floc.

More specifically, ballasted clarification is a physical and chemical treatment process that utilizes dense particles to enhance the settling velocity of aggregated suspended solids. The purpose of this process is to increase the overall density of the floc which may result in rapid floc maturation and faster clarification. Ballasted clarifiers may process flows up to ten (10) times faster than conventional clarifiers with overflow rates as high as 80 gal/ft$^2$ min while achieving total suspended solids (TSS) removal of 80 to 95 percent. This overflow rate enhancement may result in systems that have a much smaller footprint than conventional clarifiers.

Ballasted flocculation may be a high-rate clarification process that may utilize recycled media to improve settling properties of suspended solids. If a floc or microfloc can have a specific gravity greater than 1.0 (in some systems, it is desirable to have floc or microfloc with a specific gravity of greater than 2.0), then the settling time may be up to several times faster than non-ballasted flocculation systems.

However, the actions in ballasted flocculation systems have been misunderstood, resulting in selection of various ballast material that are inefficient and may be ineffective. Previously it was understood that the ballast acted as a seed for floc formulation, with solids and polymers attaching to and around the ballast. Indeed, previous art noted that "microsand acts as seed promoting the formation of especially large and heavy flocs as ballast." See U.S. Pat. No. 4,927,543.

Based upon this incorrect understanding, ballast material has been selected based upon density (to increase the settling velocity of the floc) and charge neutrality. Charge neutrality was thought to be important to allow aggregation around the ballast.

However, it is now understood that the ballast process may be based on momentum. The ballast particles may be thrust into the chemical floc by inertial forces, and may become bound in the chemical matrix. In view of the current understanding, characteristics such as hydrodynamicity and density may be important.

Hydrodynamicity, which is the ability of the ballast particle to rapidly move radially through water during flocculation and maturation, may be a relevant characteristic in that the hydrodynamicity of the ballast particles may impact the speed with which the particles may travel through the water or wastewater. More hydrodynamic particles may have a rounder shape and a low aspect ratio. The aspect ratio of a particle may be defined as the ratio between the shortest Feret diameter of a particle and the longest Feret diameter of a particle as described in W. Pabst and E. Gregorova, *Characterization of particles and particle systems*. ISO 13322-1-2014 describes image analysis methods to measure said Feret diameters of particles by fixing particles in the object plane of an imaging device. For example, images may be obtained through optical microscopy methods as known in the art.

Most ballasting materials used in the field of water treatment through clarification have an aspect ratio comprised between 1.2 and 1.7. For example, silica sand (which may be used as a ballasting material) has an aspect ratio of approximately 1.22. Some garnet, in contrast, may have a lower aspect ratio than the aspect ratio of most commonly used ballasting materials, such as silica and sand. Aspect ratio of garnet may be lower than 1.15, and may specifically be between 1.0 and 1.15, or between 1.0 and 1.10, or between 1.05 and 1.11, or between 1.0 and 1.05, or any combination of such ranges. A specific aspect ratio of garnet may be approximately 1.06. Garnet's lower aspect ratio may permit garnet to travel faster than sand in water or wastewater, and penetrate further into a floc. An aspect ratio ranging from 1.0 to 1.15 may provide for efficient floc penetration. An aspect ratio between 1.0 to 1.10 may provide additional benefits.

Density may be important not only to increase the settling speed of flocs, but also because such dense particles have a greater mass, which may have more energy during the collision process. This may allow the ballast particles to hit the microflocs and penetrate into the floc matrix by momentum.

It has been found that density between 3 and 5 g/cm$^3$, and specifically higher than 3.2 g/cm$^3$ may generally provide for effective floc penetration and sufficient floc settling rates. Ranges of 3.2-4.5 g/cm$^3$, or specifically between 3.2-3.5 g/cm$^3$ have been shown to be effective, as well as ranges between 3.5-4.3 g/cm$^3$.

Moreover, garnet has an density of 4, compared with the density of sand at 2.5. This greater density may allow garnet to have a higher settling velocity. Finally, garnet has a surface potential (zeta potential) that is less negative than quartz sand. The zeta potential of garnet ranges from approximately 16 to −41, depending on pH. In contrast, quartz sand ranges from 10 to −60. This characteristic may allow the garnet to enhance its position within the floc once it has penetrated.

Additional advantageous may be found in the use of ballast material that is more uniform. For example, the uniformity coefficient of sand (#80) has been found to be approximately 1.64. Garnet (#120) has been found to have a uniformity coefficient of 1.33. The lower the uniformity coefficient, the more uniform (well-graded, well-sorted) is the material. A low uniformity coefficient can improve the functionality of the system. Ballast material that is smaller or finer is more likely to be lost over the weir; ballast material that is larger is more likely to settle to the bottom of the tanks, preventing a homogenous system.

In general, the present invention is directed to systems and methods of clarifying water using ballasted flocculation with ballast particles specifically configured or selected to produce effective and efficient clarification, as the process is now understood. Systems and methods in accordance with some embodiments of the present invention may treat various types of water, and may generally comprise three (3) tanks and a clarifier. Influent water may be mixed with a coagulant prior to entering the first mixing tank, where the coagulant may react with soluble contaminants, such as phosphorous. The mixture may then advance to the second tank where ballast may be introduced. Such ballast may penetrate the newly formed flocs. Ballasted flocs may then be mixed together in the third tank with polymer to enhance the floc size through inertial impaction. Ballasted flocs may then move to the clarifier where the flocs may settle at a high rate while clear water may flow out over a weir. Settled sludge may be pumped to a hydrocyclone, which may separate the ballast particles from the sludge and water mix. Sludge may then be conveyed to a thickener while ballast particles may be recycled into the system.

With reference to FIG. 1, the system 100 may comprise three (3) tanks 120, 130, 140, and a clarifier 150. In general, the water may be mixed with a metal coagulant inline prior to entering the first mixing tank 120. In the first mixing tank 120, the coagulant may react with soluble contaminants in the water or wastewater, such as phosphorus, and may instigate destabilization and aggregation of suspended solids into microflocs.

The water or wastewater may then be advanced to the second mixing tank 130 where the ballast material may be introduced, as well as polymer may be introduced. The ballast material may penetrate the microflocs that have formed. As noted above, various materials that are configured and/or selected based upon characteristics including, but not limited to density and hydrodynamicity may be utilized as ballast. For example, garnet has a larger density and more hydrodynamicity than many commonly used ballast materials (such as, but not limited to, quartz sand, silica sand, biotite, dried sludge particles, etc.).

In the third tank 140 the ballasted flocs may be further mixed to enhance the size of flocs through inertial impaction, and additional polymer may be added.

Finally the enhanced ballasted flocs may move to the clarifier 150 where the flocs may settle at high velocity rates while clear water flows out over a weir 151. Flocs that settle at the bottom of the clarifier 150 may be pumped to a hydrocylone 160 which may separate the heavy ballast particles from the lighter water and sludge mix. The sludge may be conveyed to a thickener while the ballast particles may be recycled to the second mixing tank 130, so that it may be reused in the process.

More specifically, and with continued reference to FIG. 1, water or wastewater 110 may enter the system as an influent, and a metal coagulant 111 may be added inline before the water or wastewater enters the first mixing tank 120. In the first mixing tank 120, rapid mixing and/or coagulation may occur. In order to assist in the mixing of the tank, mechanical mixing devices 121 may be utilized. Mechanical mixing devices may include, but are not limited to, blades, propellers, paddles, etc. Alternatively—or in addition—hydraulic mixing of diffusers may be utilized.

The water or wastewater may then enter the second mixing tank 130 where ballast material may be added to the tank 130. Ballast material may be recycled in the process and may be ballast material that was previously used. Again, second mixing tank 130 may include a mixing device 131 that may provide mechanical or hydraulic mixing.

In accordance with some embodiments of the present invention, a third mixing tank 140 may be utilized. Note that it is contemplated that a two (2) mixing tank system may also be utilized. Third mixing tank 140—if utilized—may comprise a mixing device 141.

Water or wastewater may enter the clarifier 150, where flocs may settle to the bottom of the tank 50, while clear water may rise and flow out over weir 151, and exit the system as effluent 112. Tank 150 may comprise a bottom exit 152 into which sludge may exit the system. Sludge may flow into a hydrocyclone 160, which may separate the ballast particles from the sludge. Sludge 161 may exit the system to a thickener, while ballast particles 162 may exit the hydrocyclone 160 and be recycled back to second mixing tank 130.

Figure 2:
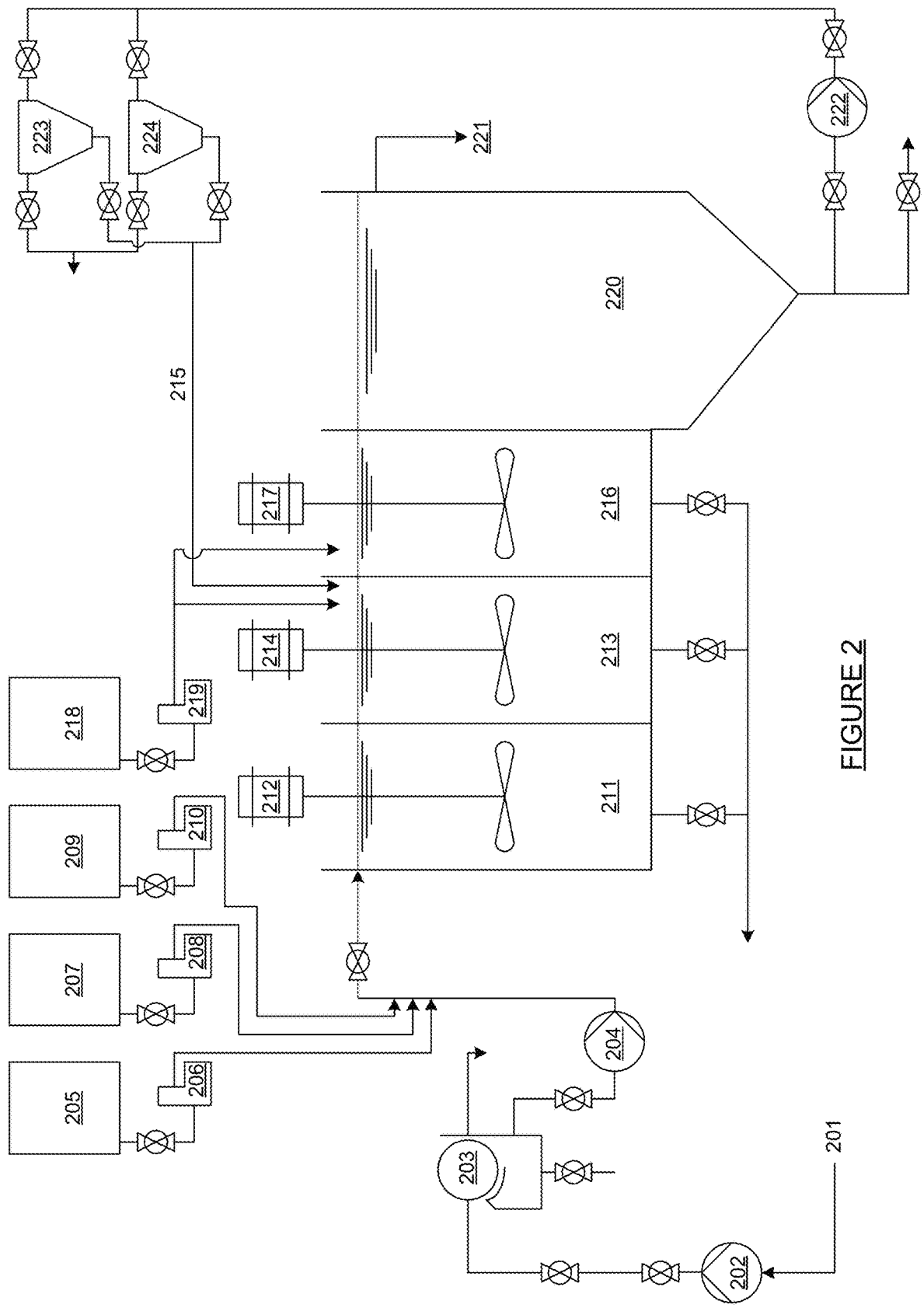
FIG. 2 depicts an exemplary piping diagram for a ballasted clarification system in accordance with some embodiments of the present invention.

With reference to FIG. 2, piping of an exemplary ballasted clarification system 200 in accordance with some embodiments of the present invention will now be discussed. Raw water—that is, water or wastewater to be treated—may flow into the system at 201, and may be pumped by pump 202. The raw water may be pumped to a rotary brush screen 203, which may be utilized to perform a solid collection (i.e., removing large solids from the water). Once screened, the water may be pumped by influent pump 204 into the first flocculation basin 211.

Along with influent, a coagulant from coagulant tank 205 (pumped by dosing pump 206), a caustic agent from caustic tank 207 (pumped by dosing pump 208), and an oxidant from oxidant tank 209 (pumped by dosing pump 210) may be added to the influent as it is provided into the first flocculation basin 211. The influent and additives may be agitated or stirred in the first flocculation basin by first mixer 210.

The fluid—now comprising the screened raw water and the additives (the coagulant, caustic agent, and oxidant) may then be provided into a second flocculation basin 213. In the second flocculation basin 213, polymer may be added from polymer tank 218—which may be pumped by dosing pump 219, and ballast material. Ballast material may be added independently, or may be added as an output of hydrocyclones 223, 224.

As discussed in greater detail above, ballast material may comprise a material with high hydrodynamicity characteristics (such as but not limited to a low aspect ratio, (for example, less than 1.15)) and a density of greater than 3.0 g/cm$^3$. The mixture in second flocculation basin 213 may be agitated or stirred by mixer 214. Such agitation or stirring may cause the ballast particles to travel through the mixture and penetrate the flocs.

The mixture may then be provided to the maturation zone 216. Additional polymer may be added to the maturation zone. The mixture may again be agitated or stirred by mixer 217. Such agitation or stirring may cause the flocs to join together and increase in size due to inertial impacts.

The mixture may then be provided into clarifier 220, where the ballasted flocs may settle at high velocity rates while clear water may flow out 221 (for example, over a weir). Note that the flocs may settle rather quickly, for example with a settling velocity greater than 1.0 cm/s.

The settled flocs now become sludge at the bottom of the clarifier 220. Settled sludge may be pumped via sludge pump 222 to a hydrocyclone 223, 224. Note that FIG. 2 illustrates a main hydrocyclone 223 and a spare hydrocyclone 224. It is contemplated that a single or multiple hydrocyclones may be used at any time. In the hydrocyclone the ballast particles may be separated from the water and sludge mix. Ballast particles may be provided back to the second flocculation basin 213 as discussed above.

The remaining sludge may be conveyed to a thickener for later treatment. Note that the properties of the ballast particles that enable the ballast to travel through the water mixture and penetrate the flocs assists in removing the ballast particles from the sludge. For systems operating at 40 m/ft$^2$, ballast loss has been found to be less than 13 kg per million gallons of water treated. According to testing, at rise rates of 40 m/ft$^2$, ballast loss was recorded at 10.8 kg per million gallons of water treated. At 45 gpm/ft$^2$, ballast loss was recorded at 9.5 kg per million gallons of water treated, and a 57 m/ft$^2$, ballast loss was recorded at 7.6 kg per million gallons of water treated.

This is particularly desirable as reduced ballast loss (i) reduces operating costs of the system (since there is less ballast to replace); and (ii) reduces damage on downstream processing components (since there is less ballast that is processed along with the sludge). Ballast that remains in the sludge can cause excessive wear on processing components.

Figure 3A:
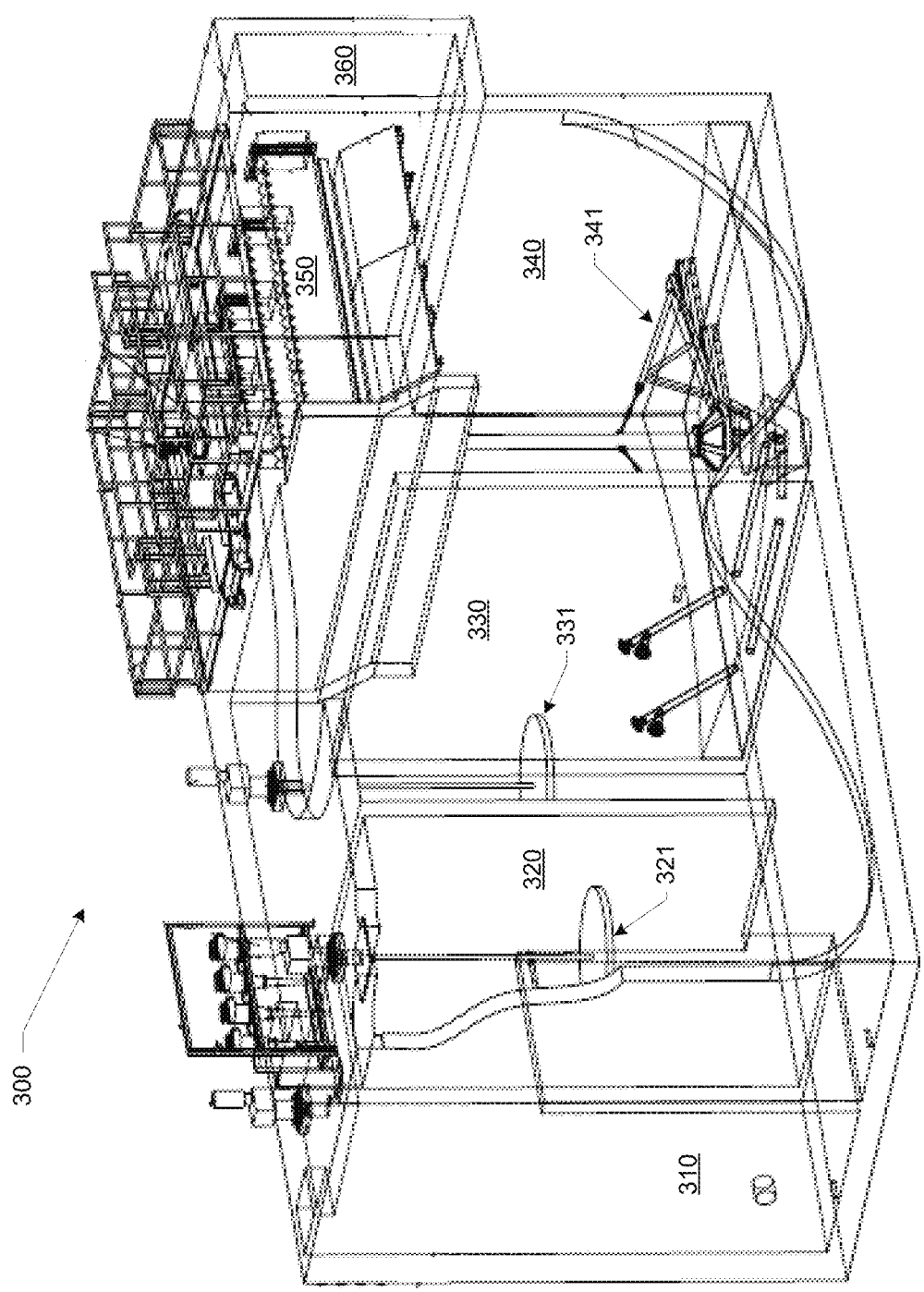
FIG. 3A-3F illustrates various views of an exemplary ballasted clarification system in accordance with some embodiments of the present invention.
Figure 3B:
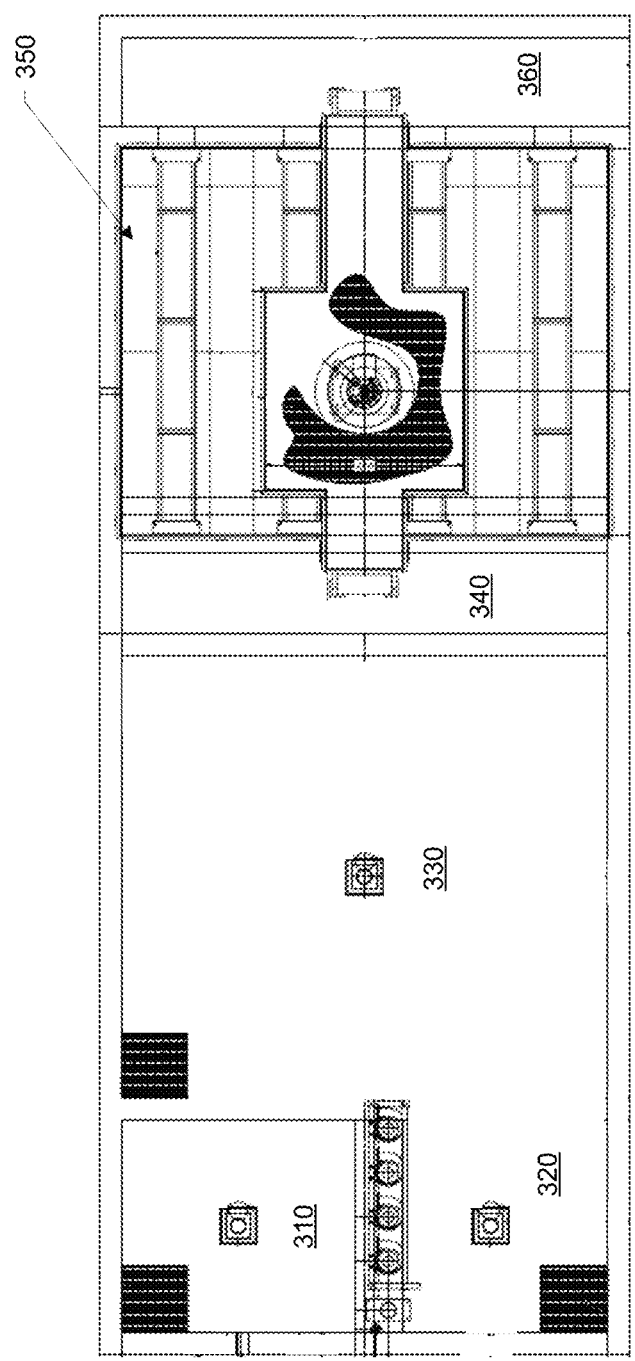
Figure 3C:
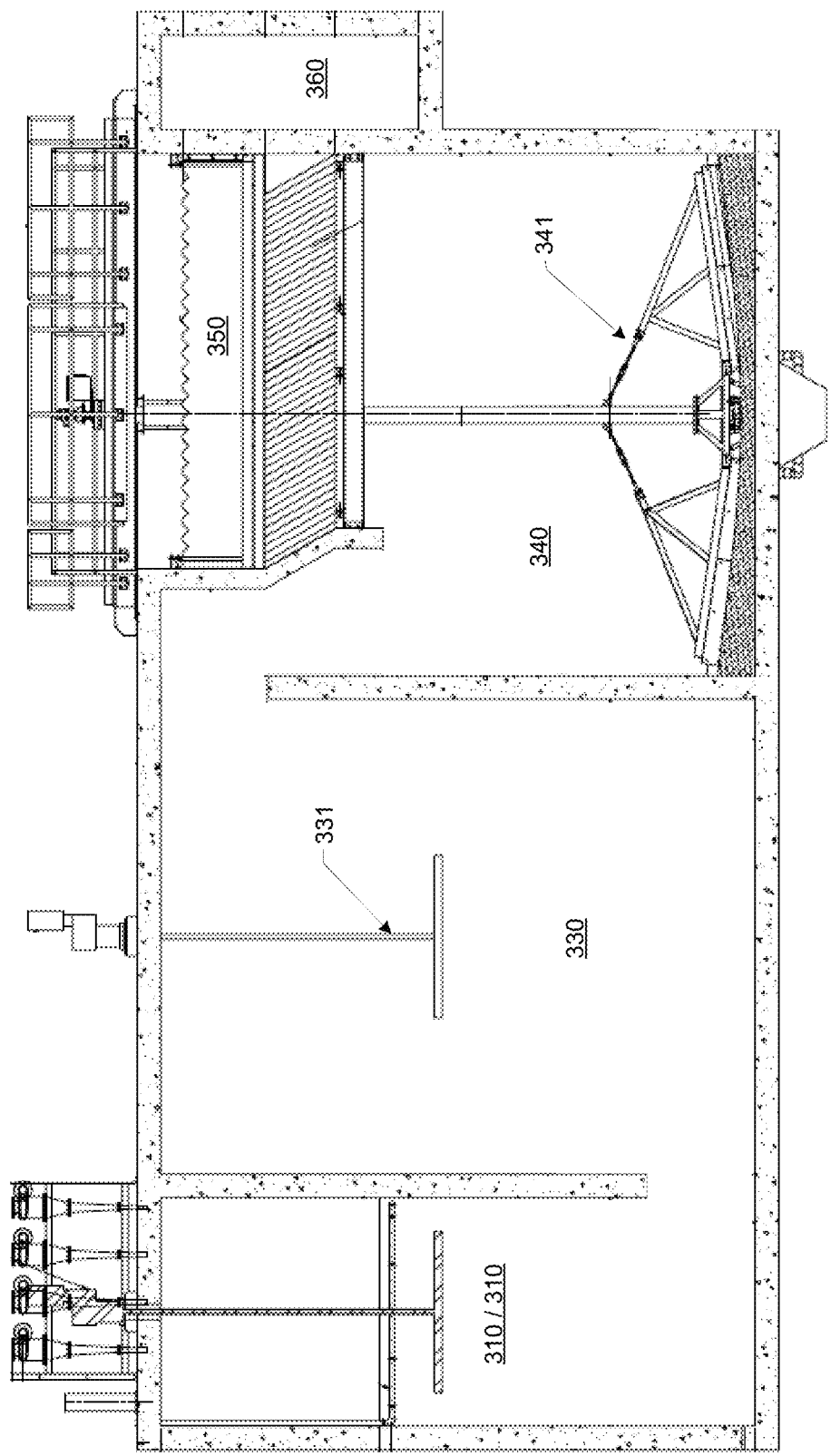

With reference to FIGS. 3A-3F, a system for providing ballasted clarification in accordance with some embodiments of the present invention will now be discussed. As an initial matter note: (i) FIG. 3A provides an isometric view of system 300; (ii) FIG. 3B provides a top view of system 300; (iii) FIG. 3C illustrates a section view of system 300—taken laterally along the system; (iv) FIGS. 3D and 3E each illustrate a section view of system 300 perpendicular to FIG.

Figure 3E:
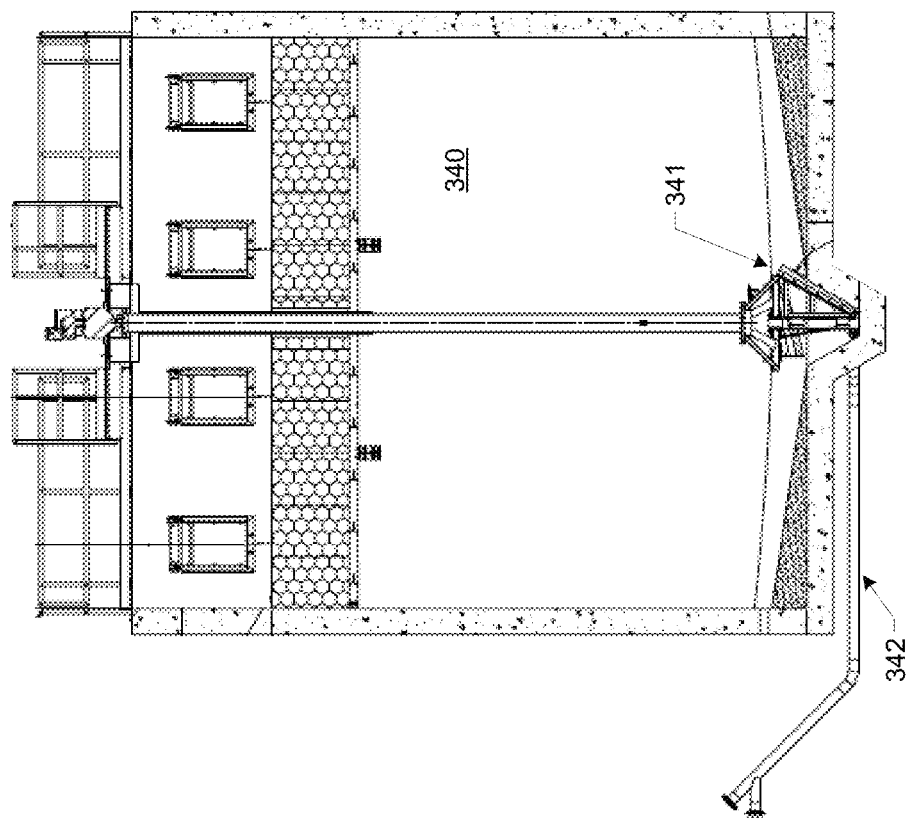
Figure 3D:
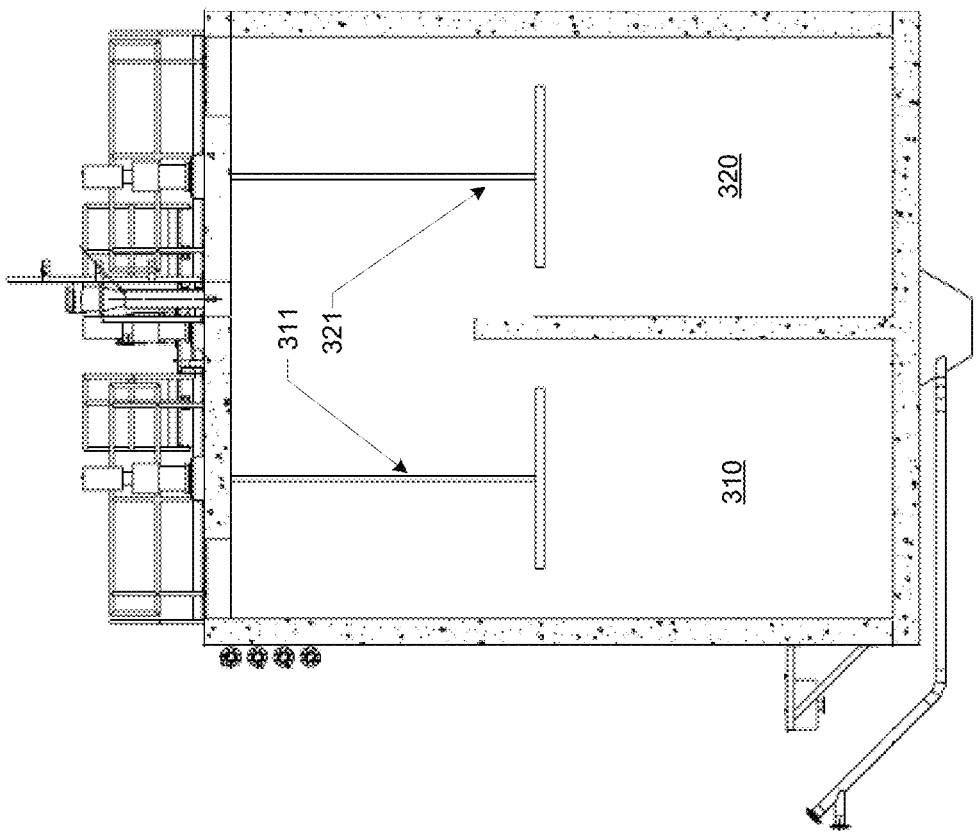
Figure 3F:
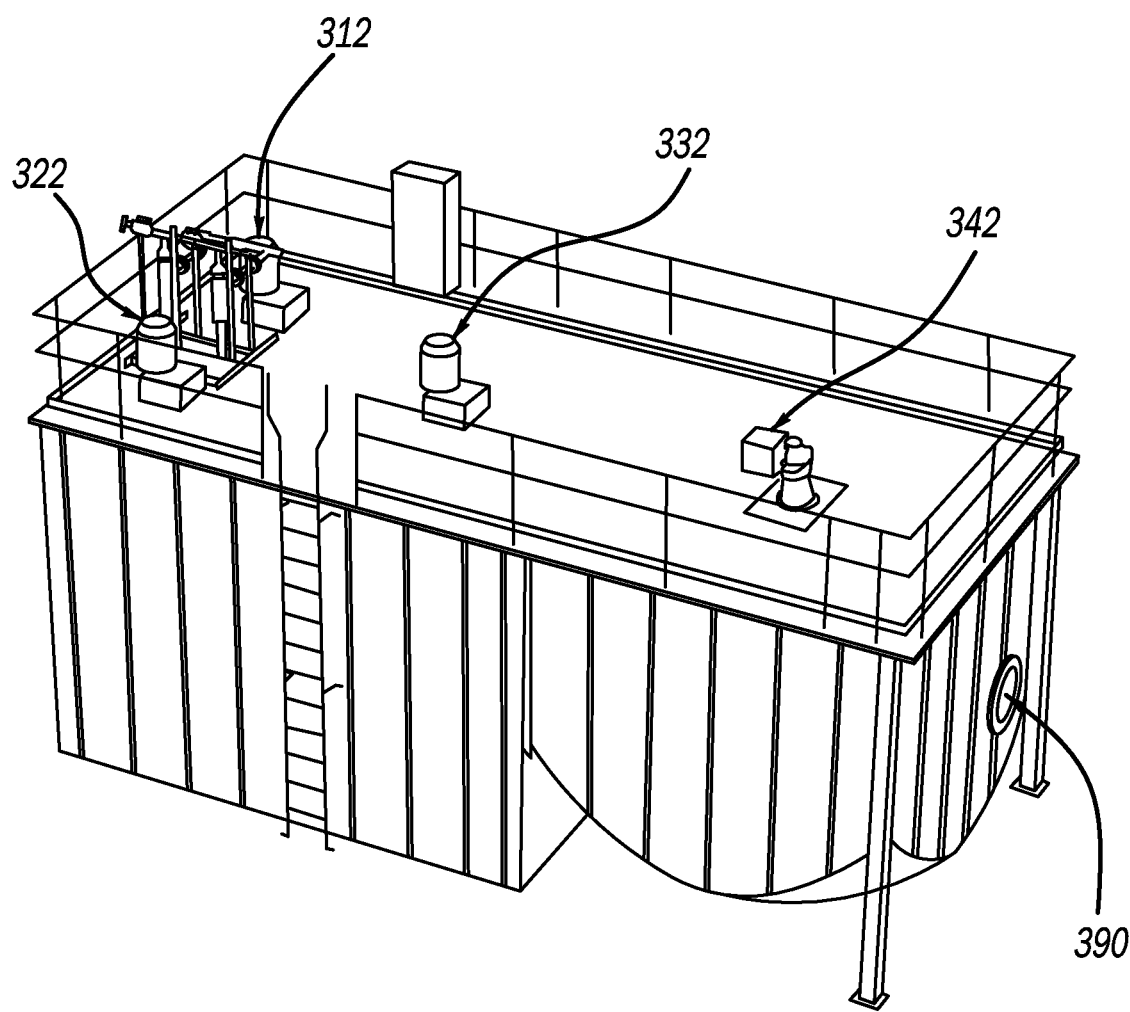

3C; and (v) FIG. 3F illustrates an external isometric view of system 300. Each will be discussed in turn.

With reference to FIG. 3A, it can be seen that system 300 generally comprises a first flocculation basin 310 and a second flocculation basin 320. In accordance with some embodiments of the present invention, first and second flocculation basins 310, 320 may be disposed next to each other along one axis, while the remaining basins and clarifier may be disposed along a perpendicular axis. In this manner, the footprint of system 300 may be maintained smaller, thereby reducing costs (such as capital expenses to build and/or purchase system 300), and requires less room for installation and use. Both first and second flocculation basins 310, 320 may comprise a mixer for agitating or stirring the mixture.

The system 300 may further comprise a maturation zone 330, which may again comprise a mixer 331 for agitating or stirring the mixture. System 300 may further comprise a clarifier 340 in which the ballasted flocs may settle and such settled flocs may be scraped by scraper 341 for processing (such as, but not limited to conveyance to hydrocyclones and/or thickeners). At the top of clarifier 340, clear water may run along a launder channel 350, and over a weir while exiting the system 300.

The provision of coagulants, caustic agents, oxidants, polymer, and ballast particles may be provided as discussed above with regard to FIGS. 1 and 2.

With reference to FIG. 3B the location of first flocculation basin 310 and second flocculation basin 320 may be transverse to the maturation zone 330. With reference to FIG. 3C, first and second flocculation basins 310, 320 may be seen. The mixture may be provided from the second flocculation basin 320 to the maturation zone 330. Note that the mixture may travel from the second flocculation basin 320 to the maturation zone 330 through an opening at the bottom of the basins, while the mixture may flow from the maturation zone 330 to the clarifier through an opening at the top of the basin. Clarifier 340 may comprise a scraper 341 for scraping settled flocs, or sludge. Clear water may run along a launder channel 350, and over a weir while exiting the system 300 at effluent channel 360.

With reference to FIG. 3D first flocculation basin 310 with first mixer 311 and second flocculation basin 320 with second mixer 321 and the arrangement of first and second flocculation basins may be seen more clearly. Note that while the first and second flocculation basins are illustrated side-by-side in a direction perpendicular to the maturation zone and clarifier, it is contemplated that such first and second flocculation basins may be disposed in any arrangement, including in a single line (for example, as graphically illustrated in FIG. 1) or in any other arrangement that may prove efficient or advantageous.

With reference to FIG. 3E the clarifier 340 may be seen in more detail. Again, clarifier 340 may comprise scraper 341 that may scrape settled flocs/sludge off of the bottom. Sludge may exit the clarifier via conduit 342.

FIG. 3F illustrates an external isometric view of system 300. The devices driving the mixers may be seen. For example, motor 312 may drive mixer 311 in the first flocculation basin 310. Motor 322 may drive mixer 321 in the second flocculation basin 320. Motor 332 may drive mixer 331 in the maturation zone 330. And motor 342 may drive the scraper 341 in the clarifier 340. FIG. 3F illustrates that a ballasted clarification system in accordance with some embodiments of the present invention may be small enough for transport while still obtaining significant clarification flow rates.

In general, ballast material as discussed above (for example, garnet), may provide at least two (2) advantages over typical ballast material (for example, microsand). First, systems and methods may have a higher throughput (or rise rate), and second may have a lower loss rate of the ballast material. Each is briefly addressed below.

Figure 4:
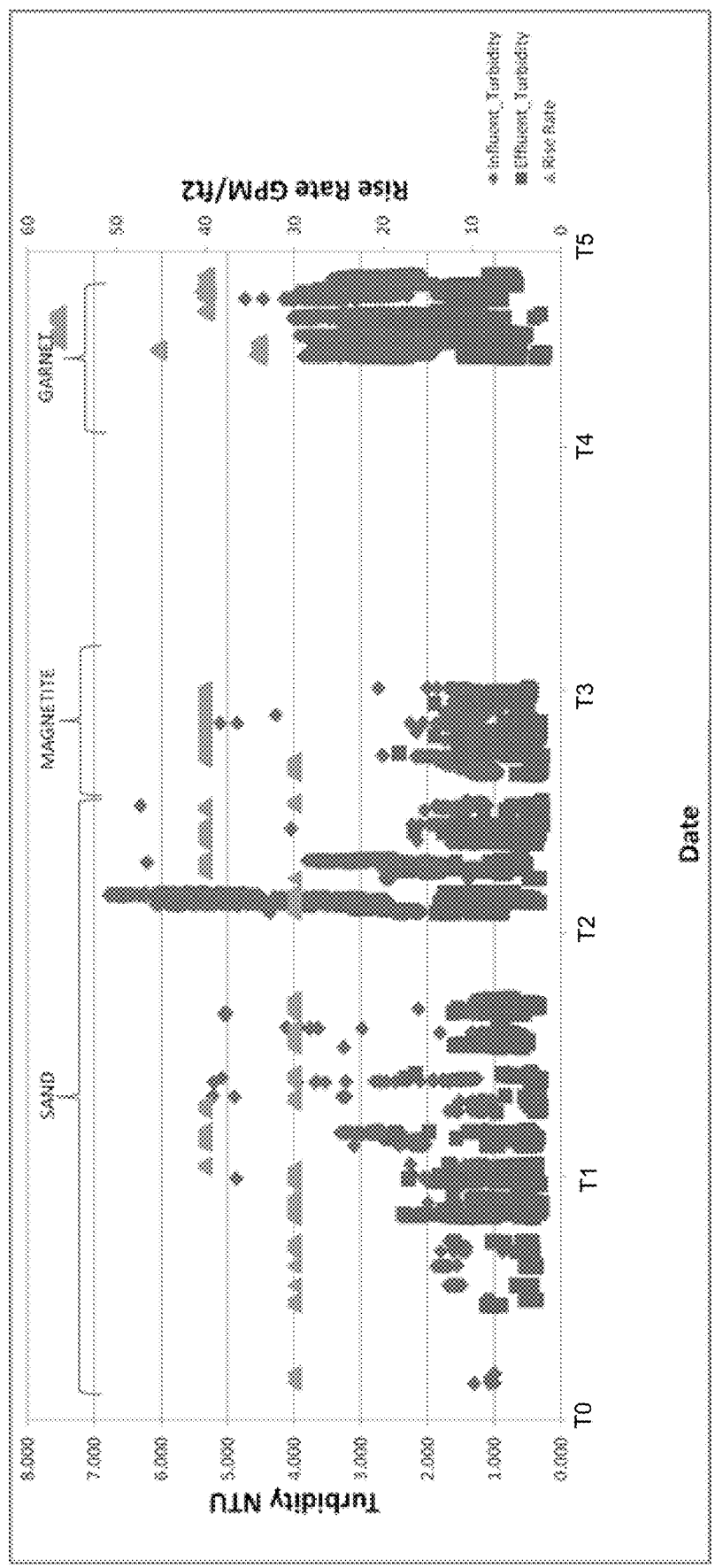
FIG. 4 illustrates turbidity results for various ballast types and rise rates, in accordance with some embodiments of the present invention.

With reference to FIG. 4, systems and methods in accordance with some embodiments of the present invention have been tested and have been successfully operated with throughput or rise rates as high as 57 gpm/ft2. Moreover, with an influent turbidity of approximately 3 nephelometric turbidity units (NTU), effluent turbidity was determined to average approximately 1.2 NTU. Effluent phosphorus was measured at less than 0.1 mg/l.

Larger and heavier particles may experience lower losses in the hydrocyclone and overflow because of their high settling velocity. However, smaller ballast particles may be more efficient at penetrating a floc. Accordingly, an optimal ballast size that maximizes these two antagonistic requirements (faster settling and better floc penetration) was identified. With regard to loss rates, the higher density and hydrodynamic characteristics of the ballast material may assist with removing more ballast from sludge in the hydrocyclone. The density may assist in forces applied on the ballast from the hydrocyclone, while the hydrodynamic qualities of the ballast (low aspect ratio, etc.) may assist the ballast in penetrating the sludge in order to be removed from the system.

The use of garnet as a ballast material was compared with sand—a commonly used ballast material. During tertiary treatment, garnet showed the lowest ballast loss rate for all rise rates tested. Specifically, at a rise rate of 40 GPM/ft$^2$, the loss rate of garnet was 29% lower than the loss rate for sand. In addition, garnet generally has a lower uniformity coefficient than sand.

With reference to Tables 1 and Table 2 below, a comparison of sand, magnetite ("mag."), and garnet as ballast materials is presented. Note that the garnet (#120) used was of a purity of approximately 37% SiO2, 33% Fe2O3, 20.5% AL2O3, 6% MgO, and 2% CaO.

TABLE 1

| Property | Sand (#80) | Garnet (#120) | Magnetite |
|---|---|---|---|
| Effective Size (μm) | 110 | 120 | 75 |
| Uniformity Coefficient | 1.64 | 1.33 | 1.2 |
| Settling Velocity of Effective Size Particles (cm/s) | 0.88 | 1.87 | 1.15 |
| Density (g/cm$^3$) | 2.5 | 4 | 5.2 |

TABLE 2

| | Sand | Magnetite | Garnet | Garnet |
|---|---|---|---|---|
| Rise Rate | 40 (gpm/ft$^2$)/ 100 (m/hr) | 40 (gpm/ft$^2$)/ 100 (m/hr) | 40 (gpm/ft$^2$)/ 100 (m/hr) | 55 (gpm/ft$^2$)/ 138 (m/hr) |

TABLE 2-continued

|  | Sand | Magnetite | Garnet | Garnet |
|---|---|---|---|---|
| Ferric Chloride (mg/l) | 30 | 25 | 25 | 25 |
| Polymer (mg/l) | 0.6 | 0.6 | 0.6 | 0.6 |
| Influent Turbidity (NTU) | 1.8 | 1.3 | 3 | 2.9 |
| Effluent Turbidity (NTU) | 0.65 | 0.53 | 0.9 | 1.3 |
| Turbidity Removal % | 64% | 59% | 70% | 55% |
| TSS (mg/l) | 5.6 | 7.4 | 4.3 | 4.7 |
| Influent Total Phosph. (mg/l) | 0.8 | 0.8 | 0.8 | 0.3 |
| Effluent Total Phosph. (mg/l) | 0.04 | 0.11 | 0.14 | 0.13 |
| Phosp. Removal % | 95% | 86% | 83% | 57% |
| Ballast Loss | 15.4 (lbs/MG)/ 1.8 (kg/1000 m$^3$) | 29 (lbs/MG)/ 3.4 (kg/1000 m$^3$) | 7.7 (lbs/MG)/ 0.9 (kg/1000 m$^3$) | 15.4 (lbs/MG)/ 1.8 (kg/1000 m$^3$) |

As discussed above, the use of ballast particles with certain characteristics (such as, but not limited to garnet) permits a ballasted clarification system to operate at higher rise rates than permitted using sand as a ballast. Increased rise rates may result in smaller systems necessary, thereby reducing both capital and operating expenses of such a system.

In testing, the rates set forth in Table 3 were recorded.

TABLE 3

| | Coagulation Tank | | Flocculation Tank | | Maturation Tank | | Settling Tank | | | |
|---|---|---|---|---|---|---|---|---|---|---|
| Settling Area | Vol. (gal) | HRT (min) | Vol. (gal) | HRT (min) | Vol. (gal) | HRT (min) | Vol. (gal) | HRT (min) | Flow Rate (GPM) | Rise Rate (GPM/ft$^2$) |
| 5.3 ft$^2$ | 178 | 1.0 | 178 | 1.0 | 540 | 3.0 | 519 | 2.9 | 180 | 34 |
| 5.3 ft$^2$ | 178 | 0.75 | 178 | 0.75 | 540 | 2.25 | 519 | 2.2 | 240 | 45 |
| 5.3 ft$^2$ | 178 | 0.6 | 178 | 0.6 | 540 | 1.8 | 519 | 1.7 | 300 | 57 |

Accordingly, it can be seen that by using a ballast material with a density greater than 3.0 g/cm$^3$ and an aspect ratio less than 1.15, rise rates greater than 40 gpm/ft$^2$ with quick settling flocs (greater than 1.0 cm/s), turbidity removal of greater than 65% and ballast loss less than 13 kg/MG may be obtained.

It will be understood that the specific embodiments of the present invention shown and described herein are exemplary only. Numerous variations, changes, substitutions and equivalents will now occur to those skilled in the art without departing from the spirit and scope of the invention. Similarly, the specific shapes shown in the appended figures and discussed above may be varied without deviating from the functionality claimed in the present invention. Accordingly, it is intended that all subject matter described herein and shown in the accompanying drawings be regarded as illustrative only, and not in a limiting sense, and that the scope of the invention will be solely determined by the appended claims.

What is claimed is:

1. A method of providing ballasted clarification of water or wastewater, comprising:
    introducing an influent into a first zone, the influent comprising the water or wastewater and a coagulant;
    agitating or mixing the influent in the first zone, wherein flocs develop in the influent caused at least in part by the coagulant;
    providing the influent from the first zone into a second zone;
    introducing polymer and ballast particles into the influent in the second zone, wherein the ballast particles have an aspect ratio of less than 1.15;
    agitating or mixing the influent in the second zone;
    penetrating the flocs with the ballast particles;
    providing the influent from the second zone into a third zone;
    agitating or mixing the influent in the third zone, wherein the agitation or mixing in the third zone causes larger flocs to form through collision of smaller flocs among the flocs;
    providing the influent into a clarifying tank having a bottom and a top, wherein the ballast particles in flocs cause the flocs to settle to the bottom of the clarifier;
    outputting an effluent from the top of the clarifying tank, the effluent comprising clear or substantially clear water.

2. The method of claim 1, further comprising:
    removing sludge comprising settled flocs from the bottom of the clarifier; and
    removing at least some of the ballast particles from the sludge.

3. The method of claim 2, wherein the ballast particles are removed from the sludge using one or more hydrocyclones.

4. The method of claim 2, wherein the ballast particles removed from the sludge are recycled to be reintroduced into the second zone.

5. The method of claim 1, wherein the method of providing ballasted clarification operates in a system with a rise rate greater than forty (40) gpm/ft$^2$.

6. The method of claim 5, further comprising removing sludge comprising settled flocs from the bottom of the clarifier and removing at least some of the ballast particles from the sludge, wherein ballast loss is less than 10.8 kilograms per million gallons of water treated.

7. The method of claim 1, wherein the ballast particles have a density greater than 3.0 g/cm$^3$.

8. The method of claim 1, wherein the aspect ratio is between 1.0 and 1.10.

9. The method of claim 6, wherein the ballast particles have a density greater than 3.5 g/cm$^3$.

10. The method of claim 1, wherein the ballast particles comprise garnet.

11. The method according to claim 1, wherein the first zone is a coagulation tank, the second zone is a flocculation tank, and the third zone is a maturation tank.

12. The method according to claim 11, wherein the method further comprises adding polymer to the maturation tank.

13. A method of providing ballasted clarification of water or wastewater, comprising:
   introducing an influent into a first zone, the influent comprising the water or wastewater and a coagulant, the first zone being a coagulation tank;
   agitating or mixing the influent in the first zone, wherein flocs develop in the influent caused at least in part by the coagulant;
   providing the influent from the first zone into a second zone, the second zone being a flocculation tank;
   introducing polymer and ballast particles into the influent in the second zone, wherein the ballast particles have an aspect ratio of less than 1.15 and a density greater than 3 g/cm$^3$;
   agitating or mixing the influent in the second zone;
   penetrating the flocs with the ballast particles;
   providing the influent from the second zone into a third zone, the third zone being a maturation tank;
   agitating or mixing the influent in the third zone, wherein the agitation or mixing in the third zone causes larger flocs to form through collision of smaller flocs among the flocs;
   providing the influent into a clarifying tank having a bottom and a top, wherein the ballast particles in flocs cause the flocs to settle to the bottom of the clarifier; and
   outputting an effluent from the top of the clarifying tank, the effluent comprising clear or substantially clear water.

14. The method according to claim 13, wherein the method further comprises adding polymer to the maturation tank.

15. A method of providing ballasted clarification of water or wastewater, comprising:
   introducing an influent into a first zone, the influent comprising the water or wastewater and a coagulant;
   agitating or mixing the influent in the first zone, wherein flocs develop in the influent caused at least in part by the coagulant;
   providing the influent from the first zone into a second zone;
   introducing polymer and ballast particles into the influent in the second zone, wherein the ballast particles have an aspect ratio between 1.0 and 1.10 and a density greater than 3 g/cm$^3$ and less than 5 g/cm$^3$;
   agitating or mixing the influent in the second zone;
   penetrating the flocs with the ballast particles;
   providing the influent from the second zone into a third zone;
   agitating or mixing the influent in the third zone, wherein the agitation or mixing in the third zone causes larger flocs to form through collision of smaller flocs among the flocs;
   providing the influent into a clarifying tank having a bottom and a top, wherein the ballast particles in flocs cause the flocs to settle to the bottom of the clarifier;
   outputting an effluent from the top of the clarifying tank, the effluent comprising clear or substantially clear water.

16. The method according to claim 15, wherein the ballast particles have a settling velocity of greater than 1 cm/s.

17. The method according to claim 15, wherein the first zone is a coagulation tank, the second zone is a flocculation tank and the third zone is a maturation tank.

18. The method according to claim 17, wherein the method further comprises adding polymer to the maturation tank.

* * * * *